United States Patent
Ogawa

(10) Patent No.: US 7,647,152 B2
(45) Date of Patent: Jan. 12, 2010

(54) CONTROL DEVICE FOR VEHICLE

(75) Inventor: Hiroyuki Ogawa, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 405 days.

(21) Appl. No.: 11/554,170

(22) Filed: Oct. 30, 2006

(65) Prior Publication Data

US 2007/0112500 A1    May 17, 2007

(30) Foreign Application Priority Data

Nov. 11, 2005    (JP) ............................. 2005-327767

(51) Int. Cl.
G06F 19/00    (2006.01)
(52) U.S. Cl. .......................... 701/57; 701/58
(58) Field of Classification Search .................. 701/51, 701/57, 65, 59; 477/43, 97
See application file for complete search history.

(56) References Cited

U.S. PATENT DOCUMENTS

| 5,954,777 A | * | 9/1999 | Cao et al. ...................... 701/51 |
| 6,141,615 A |   | 10/2000 | Saito et al. |
| 6,487,485 B1 | * | 11/2002 | Henneken et al. .............. 701/56 |

FOREIGN PATENT DOCUMENTS

| DE | 42 19 382 A1 | 12/1993 |
| DE | 44 01 416 A1 | 7/1995 |
| DE | 197 29 251 A1 | 2/1999 |
| DE | 100 22 610 A1 | 11/2001 |
| DE | 102 53 809 A1 | 5/2004 |
| JP | 4-145261 | 5/1992 |
| JP | 7-224924 | 8/1995 |
| JP | 9-501482 | 2/1997 |
| JP | 11-59233 | 3/1999 |

* cited by examiner

*Primary Examiner*—Mark Hellner
(74) *Attorney, Agent, or Firm*—Oblon, Spivak, McClelland, Maier & Neustadt, L.L.P.

(57) ABSTRACT

ECU executes a program including the steps of: detecting a mode input by a driver, detecting an accelerator opening degree TA to calculate an operation potential Pta based on the accelerator opening degree TA and an accelerator operation speed dTA, counting the number of times Pta exceeds a threshold value set according to a mode, as COUNT value, and learning a driver intention level in a sport direction when COUNT value is equal to or greater than the threshold value set according to a mode.

15 Claims, 2 Drawing Sheets

CONTROL DEVICE FOR VEHICLE

This nonprovisional application is based on Japanese Patent Application No. 2005-327767 filed with the Japan Patent Office on Nov. 11, 2005, the entire contents of which are hereby incorporated by reference.

BACKGROUND OF THE INVENTION

1. Field of the Invention

The present invention relates to a control device for a vehicle provided with a power train having a driving source and a transmission, and more particularly to a control device for a vehicle capable of realizing such vehicular behavior that matches the driver's preference.

2. Description of the Background Art

Generally, an automatic transmission connected to an engine of a vehicle is automatically controlled by determining a gear ratio based on the amount of an accelerator operation by a driver and a vehicle speed. During normal traveling, the smaller the accelerator operation amount, and the higher the vehicle speed, the gear ratio is set to the higher speed side.

Concerning such control of an automatic transmission, Japanese Unexamined Patent Publication No. 09-501482 discloses a control device for an automatic transmission for the purpose of approximating the transmission behavior of an automatic transmission to a particular driver-type behavior. This control device for changing a gear ratio of an automatic transmission includes a detection unit detecting an input variable introduced from driver-vehicle system, a generation unit generating a dependent function of the input variable (fuzzy set) and a change unit changing a gear ratio. The input variable detection unit and the dependent function generation unit interact such that an output variable that determines a gear ratio is determined by a fuzzy creation rule. At least an input variable, a throttle valve position (absolute accelerator pedal position) and a displacement motion (the magnitude and direction of change over time of the accelerator pedal position) are combined with each other according to the fuzzy creation rule, and the amount representing the driver's output request that results from the combination forms an input variable for the basic rule group and the auxiliary rule group of the fuzzy creation rule.

With the use of the control device disclosed in Japanese Unexamined Patent Publication No. 09-501482, the driver's driving manner (comfort (comfortableness), economy (cost efficiency), sport (mobility), and the like) can be identified based on the driver's driving operation and reflected in transmission control. For example, the transmission diagram is changed according to such a driving manner, so that the automatic transmission is controlled to achieve harder upshift and easier downshift or controlled to achieve harder downshift and easier upshift. Here, some vehicles are provided with a traveling mode switch for detecting such a driving manner (to manually switch among comfort, sport, economy, and the like) to allow the driver to manually select the driving manner.

However, when learning control is executed equally irrespective of the selected traveling mode, as in the control device disclosed in Japanese Unexamined Patent Publication No. 09-501482, the driver's request for the driving manner may not be reflected properly. As a result, when the vehicle is traveling, the driver's preference is not reflected so that the driver may feel uncomfortable with the unexpected or unpredicted vehicular behavior.

SUMMARY OF THE INVENTION

The present invention is made to solve the aforementioned problems. An object of the present invention is to provide a control device for a vehicle capable of realizing vehicular traveling performance that matches the driver's preference.

A control device for a vehicle in accordance with the present invention includes a detection unit detecting a control preference input by a driver of a vehicle and a control unit controlling the vehicle. The control unit estimates a driving preference of the driver based on a driving operation of the driver and controls the vehicle such that the preference is satisfied. The driving preference is estimated by changing an estimation manner according to the detected control preference.

In accordance with the present invention, a driver inputs his own control preference, and the input control preference is detected by the detection unit. The control preference includes, for example, a sport preference in which mobility of the vehicle is emphasized, a comfort preference in which comfortableness of the vehicle is emphasized, an economy preference in which cost efficiency of the vehicle is emphasized, and the like. The detection unit detects, for example, one of a sport mode, a comfort mode and an economy mode selected by a mode selection switch. For example, when detecting an operation by the driver of depressing an accelerator pedal hard and fast, the control unit estimates that the driver's driving preference is highly sportive where the mobility is emphasized. If such an operation is repeatedly detected, it is learned that the driving preference is highly sportiveness. Here, the control unit changes the degree of learning, for example, sportiveness depending on the selected control preference (sport, comfort and economy). More specifically, if not in the sport mode, learning is performed such that sportiveness is not increased so actively, and if in the sport mode, learning is performed such that sportiveness is increased actively. In this way, if the sport preference is not selected as a control preference, it is not learned that the driving preference is highly sportive even when the driver depresses the accelerator pedal heavily and hard. Therefore, the driving preference can be learned appropriately. As a result, it is possible to provide a control device for a vehicle capable of realizing vehicular traveling performance that matches the driver's preference.

Preferably, the control unit estimates the driving preference based on that at least one of an operation amount of a member operated by a driver and a rate of change of the operation amount exceeds a predetermined threshold value. The control preference includes at least two control preferences of a first control preference in which vehicle traveling performance is emphasized, a second control preference in which cost efficiency is emphasized and a third control preference in which comfortableness is emphasized. When the first control preference is selected, the control unit sets the threshold value low as compared with when one of the second control preference and the third control preference is selected.

In accordance with the present invention, when an operation amount of a member operated by a driver (accelerator opening degree) or the rate of change of the operation amount (accelerator operation speed) exceeds a predetermined threshold value, it is estimated that the driving preference is highly sportive. In this case, when the first control preference in which the vehicle traveling performance is emphasized is selected, the threshold value is set lower than when it is not selected, and thus it is likely to be estimated that the driving preference is sportive. By contrast, when the first control preference in which the vehicle traveling performance is emphasized is not selected, the threshold value is set higher than when it is selected, and thus it is less likely to be estimated that the driving preference is sportive. In this way, when the sport preference is not selected as a control preference, it is not learned that the driving preference is so sportive even when the driver depresses the accelerator pedal heavily and hard. Therefore, the driving preference can be learned appropriately.

Preferably, the driving preference is estimated based on that the number of times the threshold value is exceeded exceeds a predetermined number of times. When the first control preference is selected, the control unit sets the threshold value and the predetermined number of times low as compared with when one of the second control preference and the third control preference is selected.

In accordance with the present invention, when the number of times an operation amount of a member operated by a driver (accelerator opening degree) or the rate of change of the operation amount (accelerator operation speed) exceeds a predetermined threshold value exceeds a predetermined number of times, it is estimated that the driving preference is highly sportive. In this case, when the first control preference in which the vehicle traveling performance is emphasized is selected, the threshold value is set low and the number of times is set low as compared with when it is not selected, and thus it is more likely to be estimated that the driving preference is sportive. By contrast, when the first control preference in which the vehicle traveling performance is emphasized is not selected, the threshold value is set high and the number of times is also set high as compared with when it is selected, and thus it is less likely to be estimated that the driving preference is sportive. In this way, when the sport preference is not selected as a control preference, it is not learned that the driving preference is so sportive even when the driver depresses the accelerator pedal heavily and hard for a short time. Therefore, the driving preference can be learned appropriately even for a short time.

Preferably, the control unit controls a power source installed in a vehicle and an automatic transmission connected to the power source.

In accordance with the present invention, an engine as a power source installed in a vehicle and an automatic transmission connected to the engine are controlled, thereby achieving an output according to the control preference and the appropriately learned driving preference.

Preferably, the control unit calculates a driving force to be generated by a vehicle based on an operation of the driver and the preference and controls at least one of the power source and the automatic transmission such that the driving force to be generated is realized.

In accordance with the present invention, in a so-called driving force request-type control system, a driving force to be generated by a vehicle is calculated based on the driver's operation and the appropriately learned preference, so that an engine or an automatic transmission can be controlled based on that request driving force.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
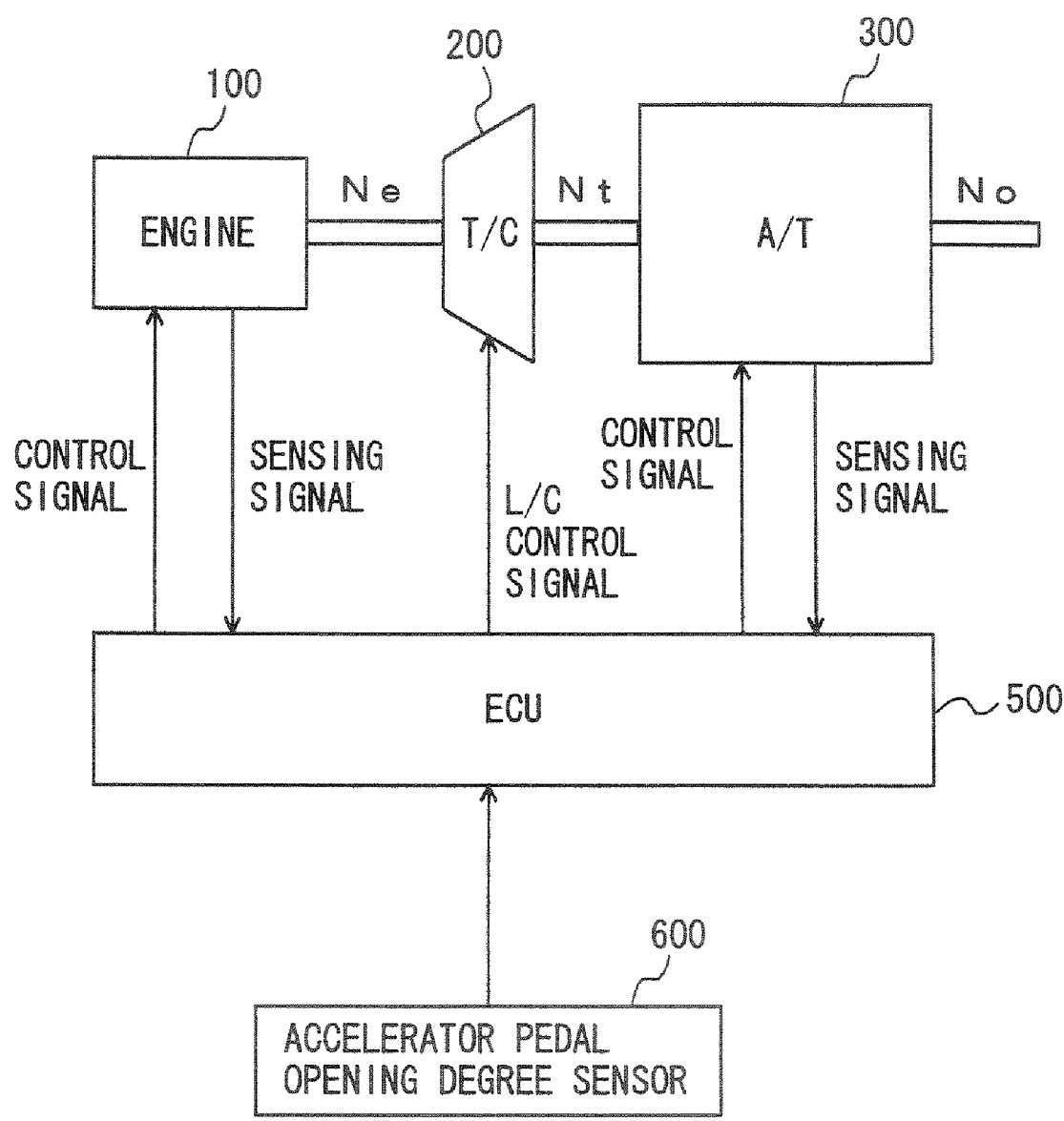
FIG. 1 is a control block diagram including ECU that is a control device for a vehicle in accordance with an embodiment of the present invention.

In the following, an embodiment of the present invention will be described with reference to the figures. In the following description, the same parts will be denoted with the same reference characters. Their designations and functions are also the same. Therefore detailed description thereof will not be repeated.

FIG. 1 illustrates a power train of a vehicle including ECU that is a control device in accordance with an embodiment of the present invention.

As shown in FIG. 1, the vehicle includes an engine 100, a torque converter 200, an automatic transmission 300, an ECU (Electronic Control Unit) 500 controlling these, and an accelerator pedal opening degree sensor 600 inputting a signal indicating the opening degree of an accelerator pedal to ECU 500. It is noted that the control device in accordance with the present embodiment is not limited to application to a vehicle including such a power train. In addition to the components of a power train, a motor (motor generator) assisting the engine may be included. Alternatively, the power train may include only a motor (motor generator) as a driving source without an engine. It is noted that in the following, description will be made to vehicle control that is applied to a power train having engine 100, torque converter 200 and automatic transmission 300 as shown in FIG. 1.

ECU 500 outputs a control signal such as a throttle opening degree command signal and receives a sensing signal such as an engine rotational speed signal.

ECU 500 also outputs a control signal to instruct a lock-up clutch of torque converter 200 of engagement or release (including slip). In addition, ECU 500 outputs a control signal that is a hydraulic pressure command signal to automatic transmission 300 and receives a sensing signal such as an output shaft rotational speed signal from automatic transmission 300.

Automatic transmission 300 is often configured with a fluid coupling and a gear-type stepped transmission mechanism or a belt-type or traction-type continuously variable transmission mechanism. Torque converter 200 serves as a fluid coupling. Torque converter 200 includes a lock-up clutch. The lock-up clutch directly couples the driving-side member (a pump impeller on the engine 100 side) and the driven-side member (a turbine liner on the automatic transmission 300 side) of torque converter 200 in a mechanical manner. Therefore, both the improved fuel-efficiency and the riding comfort can be achieved. A lock-up region in which such a lock-up clutch is engaged is usually set based on, for example, a vehicle speed and a throttle opening degree.

Accelerator pedal opening degree sensor 600 detects the opening degree of the accelerator pedal operated by the driver. Accelerator pedal opening degree sensor 600 may be replaced by a throttle valve opening degree sensor.

This vehicle is provided with a switch operated by a driver for inputting a traveling mode in order to input a preference for the driver's own driving (control preference). For example, this mode includes a sport mode in which improvement of drivability is strongly desired, a comfort mode in which improvement of comfortableness is strongly desired, an economy mode in which improvement of cost efficiency is strongly desired, and the like. The mode input switch is, for example, a switch allowing selection of any of three kinds (sport, comfort, economy). ECU 500 can learn the driver's preference appropriately based on the driving preference represented by the mode selected by this mode selection switch.

Here, comfort is a driving mode in which improvement of an NV (Noise & Vibration) characteristic has a priority. Economy is a driving mode in which improvement of a fuel-efficiency characteristic has a priority.

It is noted that the rotational speed of engine 100 (engine rotational speed) is Ne, the rotational speed of the output shaft of torque converter 200 (turbine rotational speed) is Nt, and the rotational speed of the output shaft of automatic transmission 300 (output rotational speed) is No.

Figure 2:
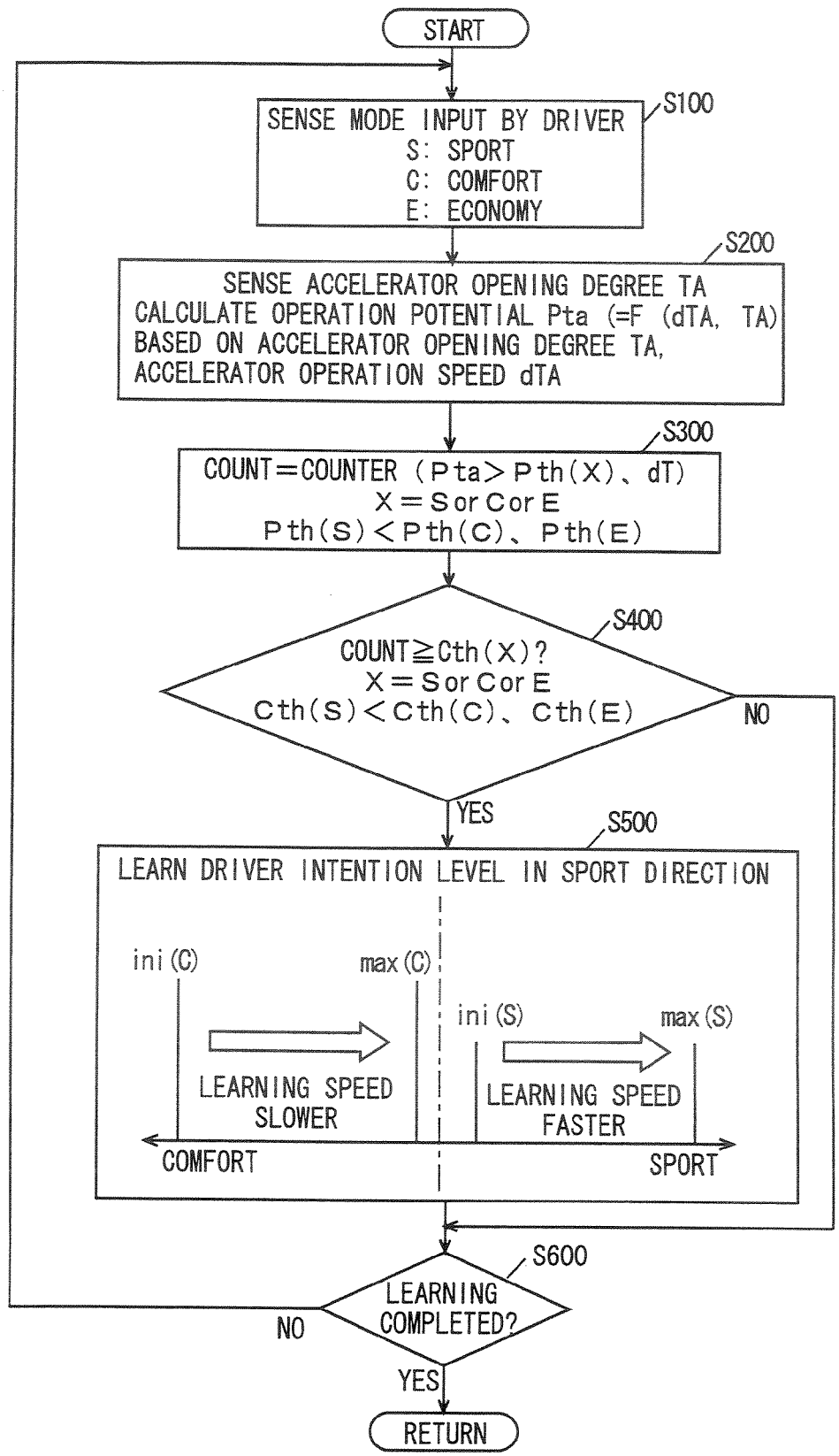
FIG. 2 is a flowchart illustrating a control structure of a program executed in ECU.

Referring to FIG. 2, a control structure of a program executed in ECU 500 as a control device in accordance with the embodiment of the present invention will be described.

At step (abbreviated as S hereinafter) 100, ECU 500 detects a mode input by the driver. Here, any of three, namely, sport (also represented by a symbol "S" hereinafter), comfort (also represented by a symbol "C" hereinafter) and economy (also represented by a symbol "E" hereinafter) is detected.

At S200, ECU 500 detects an accelerator opening degree TA. ECU 500 calculates an accelerator operation speed dTA by time differential of the accelerator opening degree TA. ECU 500 calculates operation potential Pta represented by a function F with these accelerator opening degree TA and accelerator operation speed dTA as parameters. Operation potential Pta is represented by F (dTA, TA). For example, this function F has a greater value (=Pta) with the larger accelerator opening degree TA and with the faster accelerator operation speed dTA.

At S300, ECU 500 calculates a count value COUNT by counting the number of times operation potential Pta exceeds an operation potential threshold value Pth (X) (X=S, C, E) for a predetermined time interval dT. Here, Pth (S), Pth (C), Pth (E) are set corresponding to sport (S), comfort (C), economy (E), respectively, selected by the mode selection switch. It is noted that Pth (S) is the smallest. It is noted that count value COUNT is likely to be large in the sport mode.

At S400, ECU 500 determines whether or not count value COUNT is equal to or greater than the count threshold value Cth (X). In other words, it is determined in a predetermined time interval dT whether or not the number of times the operation potential exceeds the operation potential threshold value is equal to or greater than a count threshold value Cth (X) (X=S, C, E). It is noted that the count threshold value has also Cth (S), Cth (C), Cth (E) set corresponding to sport (S), comfort (C), economy (E), respectively, selected by the mode selection switch. It is noted that Cth (S) is the smallest. In other words, the count value COUNT is more likely to be equal to or greater than the count threshold value in the sport mode. If the count value COUNT is equal to or greater than the count threshold value Cth (X) (YES at S400), the process proceeds to step S500. If not (NO at S400), the process proceeds to step S600.

At S500, ECU 500 learns a driver intention level (driving preference) by moving the driver intention level in the sport direction.

At S600, ECU 500 determines whether or not learning is completed. If it is determined that learning is completed (YES at S600), the process ends. If not (NO at S600), the process returns to S100.

The operation of ECU 500 as the control device in accordance with the embodiment of the present invention will be described based on the structure and flowchart as described above.

During travel of the vehicle, a mode input by the driver is detected (S100). Every time the driver depresses the accelerator pedal, the accelerator opening degree TA is detected, the accelerator operation speed dTA is calculated, and the operation potential Pta is calculated using the function F with the accelerator opening degree TA and the accelerator operation speed dTA as variables (S200). The stronger sport preference, the operation potential Pta becomes greater.

With a predetermined time interval dT, the count value COUNT is calculated by counting the number of times the operation potential Pta is equal to or greater than the operation potential threshold value Pth (X), and if the count value COUNT is equal to or greater than the count threshold value Cth (X) (YES at S400), learning is performed by moving the driver intention level in the sport direction (S500). As shown in FIG. 2 (although only two kinds of modes, namely, the comfort mode and the sport mode are shown here), the comfort mode and the sport mode have the respective different initial values ini (C) and ini (S) and the respective different maximum values max (C) and max (S). In addition, the learning speed also differs and is set higher in the sport mode. It is noted that this learning speed can be realized by changing dT at S300.

When the driver depresses the accelerator pedal hard and fast, the operation potential Pta is calculated as being great (S200). Here, assuming that the comfort mode is selected, since the operation potential threshold value Pth (C) is greater than the operation potential threshold value Pth(S), the operation potential P is less likely to exceed the operation potential threshold value Pth (C) and the count value COUNT is less likely to increase, as compared with when the sport mode is selected.

In addition, since the count threshold value Cth (C) is greater than the count threshold value Cth (S), the count value COUNT is less likely to be greater than the count threshold value Cth (C) as compared with when the sport mode is selected. Thus, the learning in the sport direction does not progress.

By contrast, assuming that the sport mode is selected, since the operation potential threshold value Pth (S) is smaller than the operation potential threshold value Pth (C), the operation potential P is more likely to exceed the operation potential threshold value Pth (S) and the count value COUNT is more likely to increase, as compared with when the comfort mode is selected.

In addition, since the count threshold value Cth (S) is smaller than the count threshold value Cth (C), the count value COUNT is more likely to be equal to or greater than the count threshold value Cth (C), as compared with when the comfort mode is selected. Thus, the learning in the sport direction tends to progress.

As described above, in accordance with the control device for a vehicle in accordance with the embodiment of the present invention, when learning is performed based on the driver's driving preference, the content of the learning is changed depending on the set driving mode. When the sport mode is selected, learning is performed to achieve more sportiveness. When the comfort mode is selected, learning is performed to avoid more sportiveness. Accordingly, even if the driver performs such an operation that contradicts the selected driving mode, the driver's preference can be learned in such a manner that the contradiction does not have so much influence.

It is noted that the vehicle is controlled based on the driver intention level that is learned at S500. More specifically, when the learning value of the driver intention level in the sport direction is increased, the driving force, the braking force, or the cornering force is generated with good responsivity to the driver's operation (in priority to the mobility characteristic). Such a driving force or braking force is realized by torque demand control. This control is performed in a vehicle including an engine and an automatic transmission which allows an engine output torque to be controlled independently of the driver's accelerator pedal operation, to realize positive and negative target driving torques calculated based on the amount of the accelerator pedal operation by the driver, the vehicle driving condition and the like (here, the learning value of the driver intention level in the sport direction) by a transmission gear ratio of the automatic transmission with an engine torque and the braking force of the braking device. In this control, it is possible to easily change the dynamic characteristics of the vehicle by generating a target driving torque.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device for a vehicle comprising:
   a detection unit detecting a control preference selected by a driver of a vehicle; and
   a control unit controlling said vehicle,
   wherein said control unit estimates a driving preference of said driver based on a driving operation of said driver, the driving operation being different from said control preference selected by the driver,
   wherein said control unit changes the estimated driving preference by adjusting an estimation manner based on the control preference selected by the driver, and controls said vehicle such that the vehicular behavior matches said driving preference.

2. The control device according to claim 1, wherein said control unit estimates said driving preference based on at least one of an operation amount of a member operated by a driver and a rate of change that said operation amount exceeds a predetermined threshold value,
   said control preference includes at least two control preferences of a first control preference in which vehicle traveling performance is emphasized, a second control preference in which cost efficiency is emphasized and a third control preference in which comfortableness is emphasized, and
   when said first control preference is selected, said control unit sets said threshold value low as compared with when one of said second control preference and said third control preference is selected.

3. The control device according to claim 2, wherein said driving preference is estimated based on a number of times said threshold value exceeds a predetermined number of times, and
   when said first control preference is selected, said control unit sets said threshold value and said predetermined number of times low, as compared with when one of said second control preference and said third control preference is selected.

4. The control device according to claim 1, wherein said control unit controls a power source installed in a vehicle and an automatic transmission connected to said power source.

5. The control device according to claim 4, wherein
   said control unit calculates a driving force to be generated by a vehicle based on an operation of said driver and said preference and controls one of said power source and said automatic transmission such that said driving force to be generated is realized.

6. A control device for a vehicle comprising:
   detection means for detecting a control preference selected by a driver of a vehicle;
   control means for controlling said vehicle; and
   estimation means for estimating a driving preference of said driver based on a driving operation of said driver, the driving operation being different from the control preference selected by the driver,
   wherein said estimation means includes means for estimating said driving preference by adjusting an estimation manner by said estimation means based on said control preference selected by the driver, and
   wherein said control means controls the vehicle such that the vehicular behavior matches the driving preference.

7. The control device according to claim 6, wherein
   said estimation means includes means for estimating said driving preference based on at least one of an operation amount of a member operated by a driver and a rate of change that said operation amount exceeds a predetermined threshold value,
   said control preference includes at least two control preferences, the control preferences being selected from a first control preference in which vehicle traveling performance is emphasized, a second control preference in which cost efficiency is emphasized and a third control preference in which comfortableness is emphasized, and
   said control device further comprises setting means for setting said threshold value low when said first control preference is selected, as compared with when one of said second control preference and said third control preference is selected.

8. The control device according to claim 7, wherein
   said estimation means includes means for estimating said driving preference based on a number of times said threshold value exceeds a predetermined number of times, and
   said setting means includes means for setting said threshold value and said predetermined number of times low when said first control preference is selected, as compared with when one of said second control preference and said third control preference is selected.

9. The control device according to claim 6, wherein said control means includes means for controlling a power source installed in a vehicle and an automatic transmission connected to said power source.

10. The control device according to claim 9, further comprising calculation means for calculating a driving force to be generated by a vehicle, based on an operation of said driver and said preference, wherein
    said control means includes means for controlling at least one of said power source and said automatic transmission such that said driving force to be generated is realized.

11. A control method for a vehicle, the method comprising:
    detecting a control preference selected by a driver of a vehicle;

estimating a driving preference of said driver based on a driving operation of said driver, the driving operation being different from the control preference selected by the driver;

estimating the driving preference by adjusting an estimation manner based on the control preference selected by the driver; and controlling the vehicle such that the vehicular behavior matches the driving preference.

12. The control method according to claim 11, wherein the driving preference is estimated based on at least one of an operation amount of a member operated by a driver and a rate of change that said operation amount exceeds a predetermined threshold value, wherein said control preference includes at least two control preferences, the control preferences being selected from a first control preference in which vehicle traveling performance is emphasized, a second control preference in which cost efficiency is emphasized and a third control preference in which comfortableness is emphasized, said control method further comprises:

setting the threshold value low when the first control preference is selected, as compared with when one of the second control preference and the third control preference is selected.

13. The control method according to claim 12, further comprising:

estimating the driving preference based on a number of times the threshold value exceeds a predetermined number of times; and setting the threshold value and the predetermined number of times low when the first control preference is selected, as compared with when one of the second control preference and the third control preference is selected.

14. The control method according to claim 11, further comprising:

controlling a power source installed in a vehicle and an automatic transmission connected to said power source.

15. The control method according to claim 14, further comprising:

calculating a driving force to be generated by a vehicle, based on an operation of the driver and said preference; and controlling at least one of said power source and said automatic transmission such that said driving force to be generated is realized.

* * * * *